Jan. 16, 1923.

W. H. UTLEY.
ROTARY PUMP, ENGINE, OR METER.
FILED JUNE 24, 1914.

Witnesses

Inventor
W. H. Utley,

Patented Jan. 16, 1923.

1,442,198

UNITED STATES PATENT OFFICE.

WILLIE HERBERT UTLEY, OF LONDON, ENGLAND; EMILY UTLEY, ADMINISTRATRIX OF SAID WILLIE HERBERT UTLEY, DECEASED, ASSIGNOR OF ONE-HALF TO ARTHUR KITSON, OF STAMFORD, LINCOLNSHIRE, ENGLAND.

ROTARY PUMP, ENGINE, OR METER.

Application filed June 24, 1914. Serial No. 847,045.

(GRANTED UNDER THE PROVISIONS OF THE ACT OF MARCH 3, 1921, 41 STAT. L., 1313.)

*To all whom it may concern:*

Be it known that I, WILLIE HERBERT UTLEY, a subject of the King of England, residing at London, England, have invented certain new and useful Improvements in Rotary Pumps, Engines, or Meters, of which the following is a specification.

This invention is for improvements in or relating to rotary pumps, engines or meters of the type wherein a circular rotor is set eccentrically in a drum-shaped blade-chamber, the outer periphery of the rotor being in contact with the inner periphery of the blade chamber, and a double-ended sliding blade is mounted in the rotor so that it can slide through the centre of the same whilst its ends sweep the walls of the chamber.

Such rotary pumps and engines are well known and have been made with chambers of various shapes with a view to getting the best results and keeping the ends of the blades so near to the inner periphery of the walls of the chamber as to prevent the passage of fluid between such ends and the wall of the chamber, which leakage would, of course, result in loss of efficiency; in some cases the blade ends have been spring-controlled so that they could follow the contour of the chamber.

The object of the present invention is to provide a rotary pump or engine having a blade-chamber so shaped that not only is the use of means to maintain the blade ends in continual contact with the interior of the chamber rendered unnecessary but in addition the blade will be caused to rotate more smoothly than in such rotary engines at present known.

According to the present invention, the blade-chamber is so shaped that within each quadrant bounded by a diametral line passing through the centre of the rotor and the point of contact of the rotor with the chamber, any angular displacement of the blade occasions an endwise displacement thereof through the rotor which is proportional to the square of the aforesaid angular displacement measured from the said diametral line and expressed as a fraction of a right angle. The curve of the blade chamber is such that as the blade is displaced through a quarter of a revolution from the point of contact of rotor and chamber, the length of blade intercepted between the inner surface of the chamber and the periphery of the rotor is equal to half the maximum protrusion of the blade, that is to say, the length of the blade minus the diameter of the rotor, multiplied by the square of its angular displacement measured as aforesaid and expressed as a fraction of a right-angle.

A further condition which, as a feature of the present invention, may be advantageously imposed upon the shape of the curve of the blade chamber is that the parts should be so proportioned that half the maximum protrusion of the blade shall not be greater than the radius of the rotor multiplied by the expression $\frac{\pi^2}{8}$. With a blade chamber so shaped and proportioned, the endwise acceleration of the blade will be constant during a uniform rotor speed and will be always directed towards the centre of the rotor and in consequence wear between the blade ends and the inner periphery of the blade chamber will be reduced to a minimum and all shocks between the blade and its chamber such as would arise from a varying acceleration will be eliminated. Other features of novelty will hereinafter appear and are pointed out in the claims, and the nature of this invention and the manner in which it is to be performed, is further described with reference to the accompanying drawings, in which—

If the required path of the centre point in the centre line of the blade, as seen in end elevation, be determined, the contour of the inner surface of the blade chamber can be easily described as will hereinafter appear.

Figure 1:
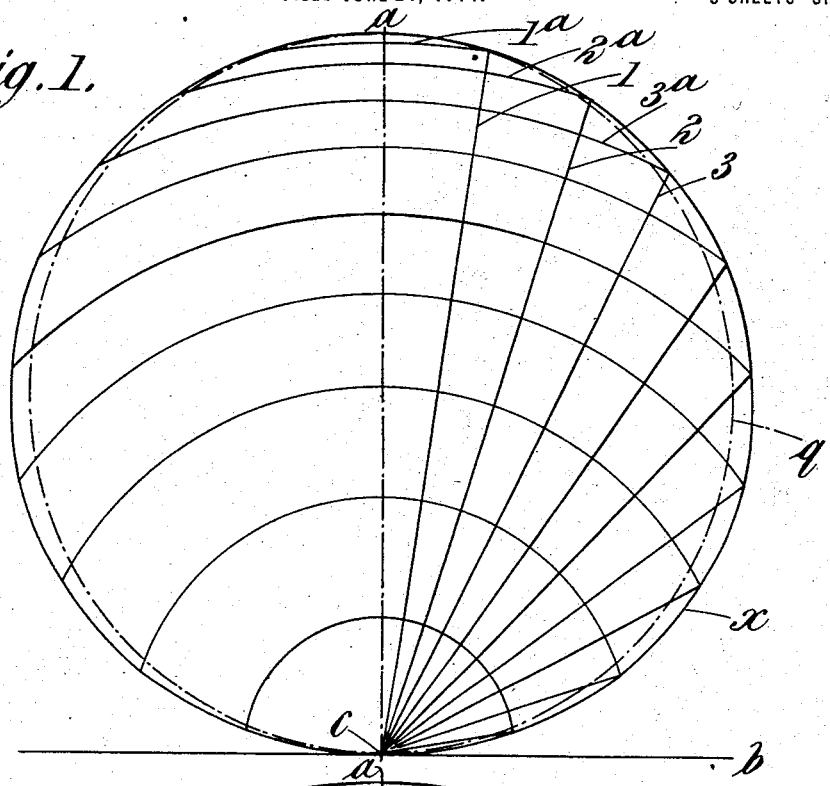
Figure 1 is a diagram illustrating the shape of the path of the centre point in the centre line of the blade and the manner in which the said path is ascertained.

Figure 1 shows the method of determining the path of the said point in the blade (which point hereinafter will be called the centre of the blade). This figure is drawn on the supposition that when the blade is at its maximum protrusion it is vertical and protruding upwardly from the rotor. A vertical line $a$ is set up equal to half the maximum protrusion of the blade. The bottom of the line $a$ rests upon a line $b$ at right-angles to it, which represents the horizontal position of the blade, and the point of contact $c$ between these two lines is the centre of rotation of the rotor. The right-angle $a\ c\ b$ is sub-divided into any convenient number of equal parts by radii from the point $c$; in the case shown ten equal parts are taken and the numeral attached to each radius therefore indicates the number of tenths of the right-angle $a\ c\ b$ by which it is displaced from the line $a$. The line $a$ is sub-divided into one-hundred equal parts numbered from the top, and, from points on it corresponding to the squares of the fractions one-tenth, two-tenths, three-tenths, etc., of its length, circular arcs are struck from the centre $c$ and each such arc is continued to meet the radius whose angular displacement from the line $a$ has the fractional value of the right-angle $a\ c\ b$ which corresponds with the fraction whose square has been taken to determine the point on the line $a$. Thus the arc $1^a$ intersects the radius 1, the arc $2^a$ the radius 2, and so on: the radius of $1^a$ is less than the length of the line $a$ by one-hundredth of its length, the radius of $2^a$ less than the length of $a$ by four-hundredths of its length, the radius $3^a$ less than the arc $a$ by nine-hundredths; and so on. By joining together the points of intersection between the arcs $1^a$, $2^a$, $3^a$, etc., and their corresponding radii, a curve is obtained which constitutes the path required, as shown at $x$. The path is symmetrical about the line $a$, so that one half having been determined the other half is either similarly determined or copied from the first. In order to show the difference between this curve $x$ and a circle, a circle $q$ has been drawn in chain line in Figure 1 upon the line $a$ as diameter.

Figure 2:
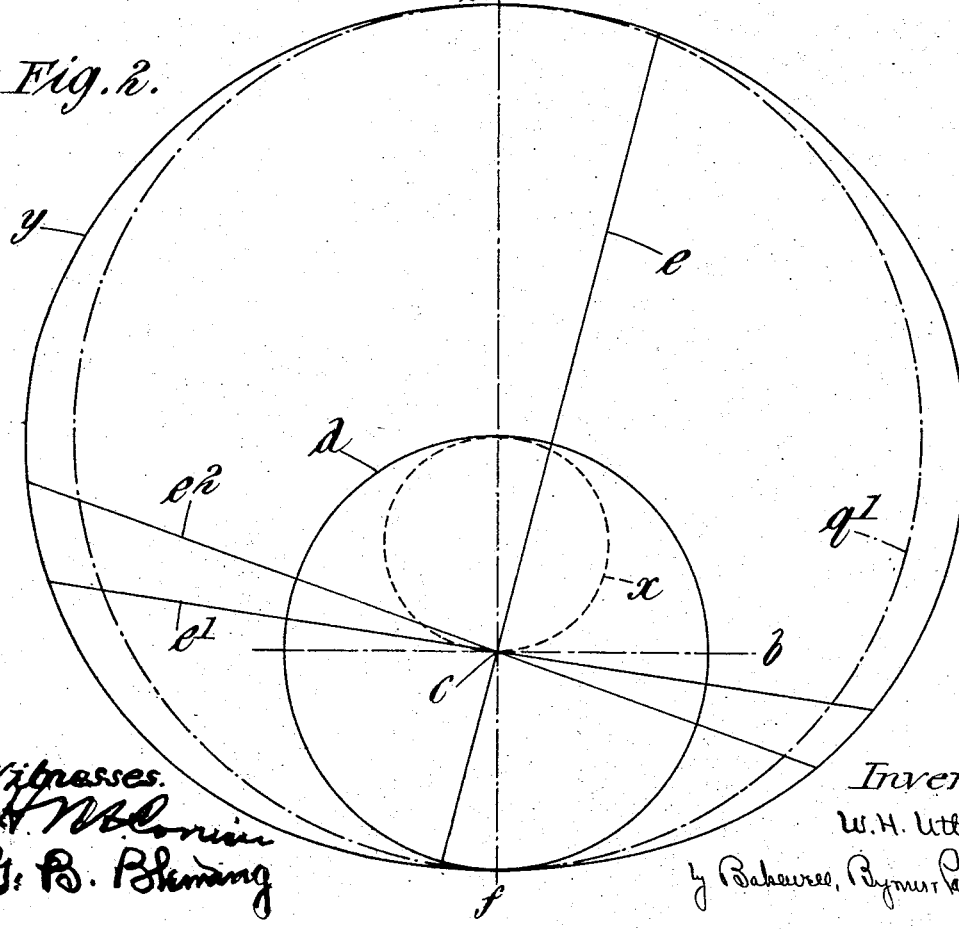
Figure 2 is a diagram illustrating the shape of the blade chamber and how the same is derived from the curve shown in Figure 1.

To determine the shape of the blade chamber the diameter of the rotor and the length of blade to be employed must first be assumed and, in Figure 2, a rotor is indicated by the circle $d$ and a blade by the line $e$. The line $a$ is then drawn in the rotor as a radius thereto of length equal to half the maximum protrusion of the blade and in such a position that, when produced through the centre, it cuts the circle $d$ at the intended point of contact of the rotor with the blade chamber, namely the point $f$. The curve $x$ is then drawn in the described manner with respect to the line $a$ and, since the blade always passes through the centre of rotation $c$ of the rotor, lines such as $e^1\ e^2$ will represent two positions in which the blade will lie. Since the path of the centre of the blade is determined by the curve $x$, one-half the length of the blade can at once be set off along such lines as $e^1\ e^2$ in both directions from the points of their intersection with the curve $x$. The ends of such lines as $e^1\ e^2$ will be found to describe the curve shown at $y$ and this is the curve to which the inner surface of the blade chamber must conform. For the purpose of comparison a circle shown at $q^1$ is drawn in chain line within the curve $y$. It is to be observed that the proportions have so been chosen in Figure 2 that the length of the blade $e$ is just twice the diameter of the rotor $d$.

Figure 3:
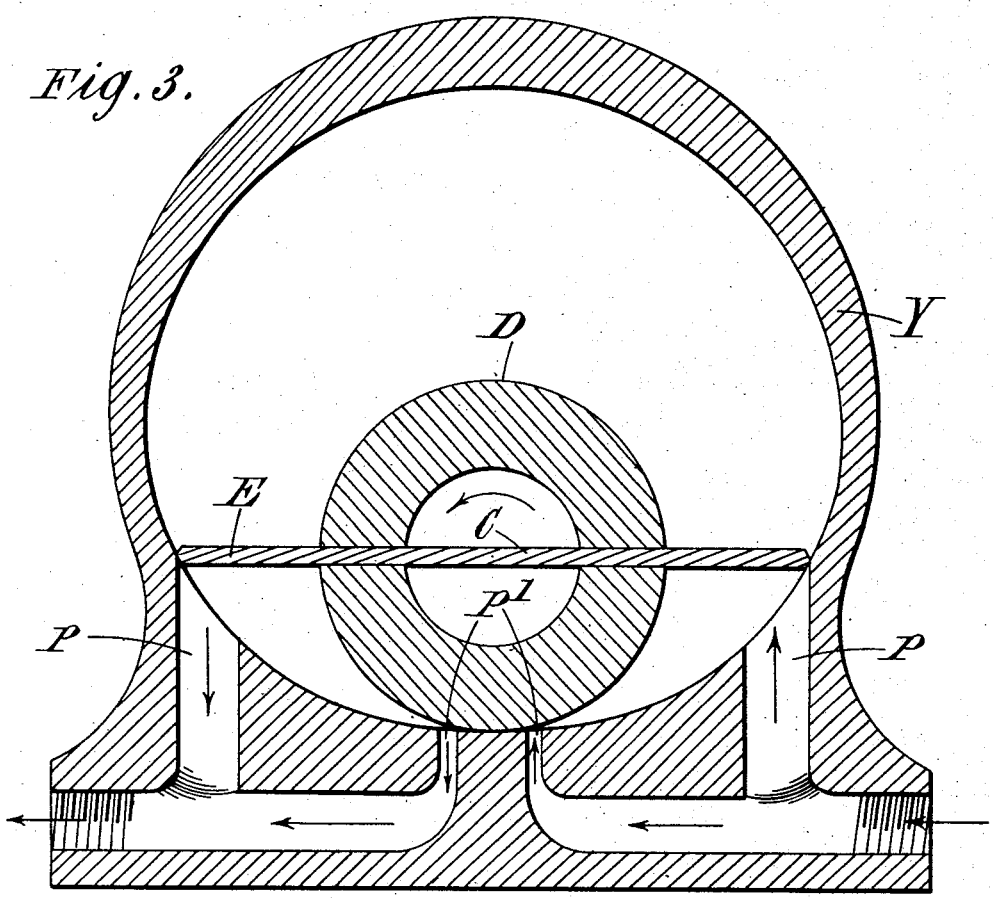
Figure 3 is a diagrammatic transverse section of a pump according to this invention.

In Figure 3 is shown in diagrammatical transverse section a pump whose blade chamber conforms to the required curve, the rotor being shown at D, the blade at E, and the blade casing at Y. The centre of rotation of the drum is at C, and in order to facilitate movement of fluid under the rapid change of volume as the blade approaches the horizontal from the vertical, main ports are provided in the positions shown at P, and auxiliary ports at $P^1$.

Figure 4:
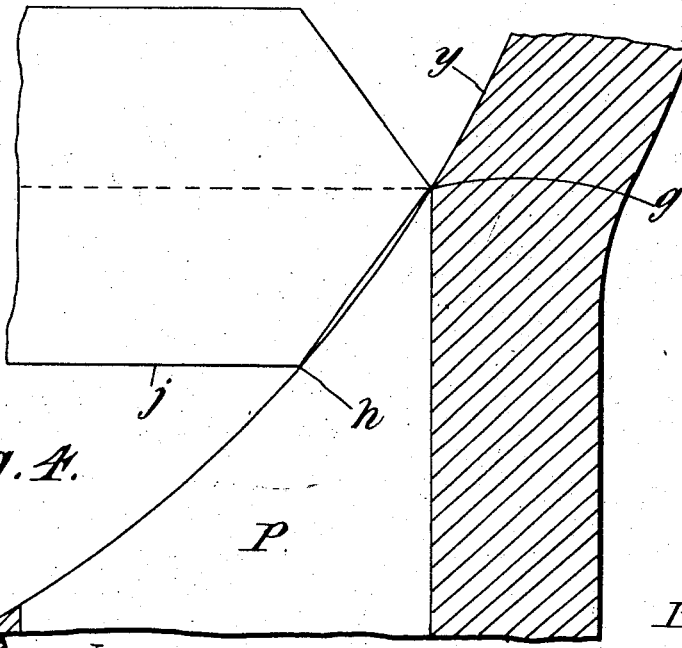
Figure 4 is a sectional elevation of a detail to a larger scale than that of Figure 3.

In order that the ends of the blade may not bind upon the chamber wall and yet fit closely thereto, the ends are bevelled in the manner indicated in Figure 4. When the blade is in the horizontal position shown in Figure 3 it is in contact with the curve $y$ at the two points of greatest curvature, and if the blade be free from binding here it will also be free at every other point. The end is bevelled away as seen in Figure 4 on both sides of the mid line $g$. The under bevel is a straight face terminating on the line $h$ lying both on the curve $y$ and on that face $j$ of the blade which is towards the point $f$, that is towards the line of contact of the rotor with the chamber wall. The upper bevel is identical with the under, since it is that fulfilling the same conditions on the opposite of the vertical when the blade has been rotated through 180°.

Figure 5:
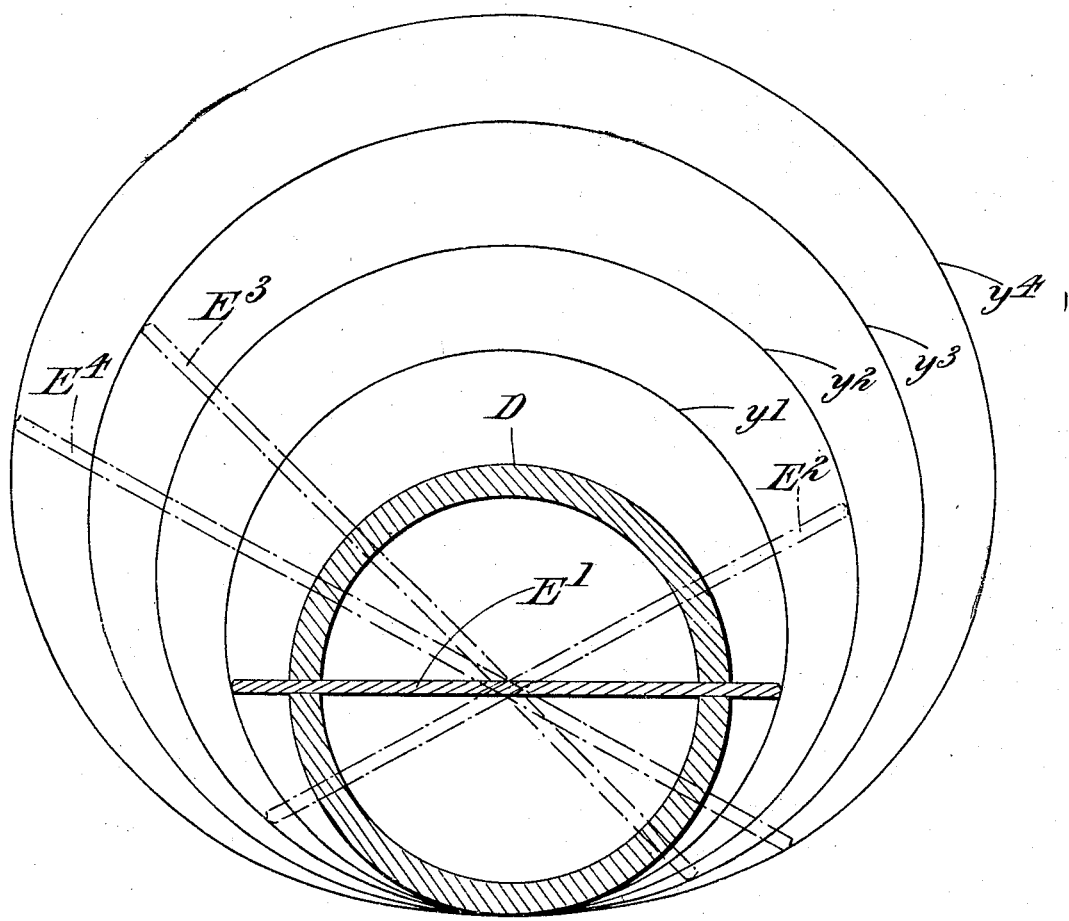
Figure 5 is a diagram illustrative of the effect of certain modifications.

In Figure 5 are shown four contours $y^1$, $y^2$, $y^3$ and $y^4$ for a blade chamber to co-operate with a drum D and with blades $E^1$, $E^2$, $E^3$ and $E^4$ respectively, whose respective lengths are one and a quarter, one and a half, one and three-quarters, and twice the diameter of the rotor D.

It has been hereinbefore stated as a requirement of the blade-chamber that it shall be of such shape that the endwise displacement of the blade shall be proportional to the square of its angular displacement measured as a fraction of a right angle.

The above described method for obtaining the curve $y$ satisfies this requirement as will be understood when it is considered that the endwise displacement of the blade is equal to the difference between, or the sum of, the eccentricity of the rotor with respect to the mid-depth of the blade-chamber and the polar ordinate or radius vector of the curve $x$, the centre of the rotor being the origin. It may be stated then that where $\rho$ = the radius of the path of the centre point in the centre line of the blade; the centre of the rotor being the origin and the line of maximum protrusion of the blade being the initial line, P = the eccentricity of the rotor with respect to the mid-depth of the blade-chamber, or in other words, half the maximum protrusion of the blade $(a-r)$, where $2^a$ equals the length of the blade and $r$ equals the radius of the rotor, and $\phi$ = the angle which the line drawn from the origin to the point in the path of the centre of the blade makes with the initial line, the endwise displacement of the blade =

$$\left(\frac{\phi}{90}\right)^2 P$$

and $$\rho = P - \left(\frac{\phi}{90}\right)^2 P$$
$$= P\left\{1 - \left(\frac{\phi}{90}\right)^2\right\}$$
$$= P\left\{1 - \frac{\phi^2}{\frac{\pi^2}{4}}\right\}$$
$$= P\left\{1 - \frac{4\phi^2}{\pi^2}\right\}$$
$$= P\frac{\{(\pi + 2\phi)(\pi - 2\phi)\}}{\pi^2}$$

which last expression states in a convenient form the law to which each half of the curve $x$ conforms.

The angle $\phi$ it will be observed can never exceed the value $\frac{\pi}{2}$, that is a right-angle, and when $$\phi = \frac{\pi}{2}, \rho = 0$$

and in passing through zero changes its sign. Hence, in the first and third quadrants of a complete revolution of the rotor, starting from the line of maximum protrusion of the blade, the centre of the blade moves towards the centre of the rotor, while in the second and fourth of such quadrants it moves away from the centre of the rotor.

The curve of the blade chamber itself has for its law the expression $R = a \pm \rho$.

Where R = the radius vector of the curve of the blade chamber with origin and initial line as before and $a$ = half the length of the blade The object of limiting the proportions of the parts so that half the maximum protrusion of the blade, is not greater than $\frac{\pi^2}{8}$ times the radius of the rotor, is to ensure that the radius of curvature of the blade chamber shall always be finite (except when it is zero) and positive with regard to the centre of the rotor, the curve having these properties when subject to this limitation; and the condition that the distance of any point on the curve shall be proportional to the square of the angular displacement, (a right-angle being taken as unity) is to obtain, with an unvarying speed of rotation of the rotor, an endwise acceleration of the blade which shall be unvarying in magnitude and always directed towards the centre of the rotor.

The following schedule indicates, by way of example, the procedure to be followed for a drum of two inches diameter and a blade of 3.62 inches length.

| Angular rotation. | Total advance. | Step advance of cutter. | Difference. |
|---|---|---|---|
| 1° | 0.0001" | 0.0001" | |
| 2° | 0.0004" | 0.0003" | 0.0002" |
| 3° | 0.0009" | 0.0005" | 0.0002" |
| 4° | 0.0016" | 0.0007" | 0.0002" |
| etc. | etc. | etc. | |

In this schedule "Angular rotation" indicates the rotation of the pump casing about the centre of rotation of the rotor; "Total advance" indicates the total advance of the cutter of a milling machine in a line at right-angles to the axis of rotation of the rotor, that is a radial line starting from zero, which is at the point of contact of the rotor with the casing; "Step advance of cutter" is the amount by which the radial movement is advanced for the next angular rotation. It will be observed from the last column that the differences between any two successive numbers in the "Step advance" column is a constant, and such a manipulation of a milling machine is not difficult.

It is a feature of my invention that I place the rotor at the bottom of the vertical axis of the blade chamber in order that the acceleration due to gravity may coincide with the acceleration due to the kinematical conditions of the machine constructed in accordance with the principle of my invention, but where it is desired to eliminate the action of gravity and where such a position is practicable, the machine may be so constructed that the axis of rotation of the rotor is in a vertical position, by which means the effect of gravity on the motion of the blade is rendered nil.

Furthermore, this invention may be applied either to a pump arranged to draw fluid through it and discharge it, or to force fluid forward or to an engine which is driven by fluid means, or to such a device, for example, as a water meter which is intended to be covered by the expression "engine".

What I claim as my invention and desire to secure by Letters Patent is:—

1. In a fluid pressure machine, the combination of a casing wherein is a drum-shaped chamber, a rotor rotatably mounted within the chamber in such a position as substantially to make contact with the curved wall of the chamber, and a blade slidably mounted in the rotor to move radially of the rotor and at right angles to the axis of the rotor, the curved wall of the said chamber being so shaped that within each quadrant bounded by a diametral line passing through the centre of the rotor and the point of contact of the rotor with the chamber, any angular displacement of the blade occasions an endwise displacement thereof through the rotor which is proportional to the square of the aforesaid angular displacement measured from the said diametral line and expressed as a fraction of a right angle.

2. In a fluid pressure machine the combination of, a casing wherein is a drum-shaped chamber, a rotor rotatably mounted within the chamber in such a position as substantially to make contact with the curved wall of the chamber and a blade slidably mounted in the rotor to move radially of the rotor and at right angles to the axis of the rotor, the curved wall of the said chamber being so shaped that as the blade is displaced through a quarter of a revolution from the point of contact of rotor and chamber, the length of the blade intercepted between the inner surface of the chamber and the periphery of the rotor is equal to half the maximum protrusion of the blade multiplied by the square of its angular displacement expressed as a fraction of a right-angle and measured from the said point of contact.

3. In a fluid pressure machine, the combination of, a casing wherein is a drum-shaped chamber, a rotor rotatably mounted within the chamber in such a position as substantially to make contact with the curved wall of the chamber, and a blade slidably mounted in the rotor to move radially of the rotor and at right angles to the axis of the rotor, the curved wall of the said chamber being so shaped that within each quadrant bounded by a diametral line passing through the centre of the rotor and the point of contact of the rotor with the chamber, any angular displacement of the blade occasions an endwise displacement thereof through the rotor which is proportional to the square of the aforesaid angular displacement measured from the said diametral line and expressed as a fraction of a right angle, and the drum and chamber are so relatively proportioned that half the maximum protrusion of the blades is not greater than $\frac{\pi^2}{8}$ times the radius of the rotor.

4. In a fluid pressure machine, the combination of a casing wherein is a drum-shaped chamber, a rotor rotatably mounted within the chamber in such a position as substantially to make contact with the curved wall of the chamber, and a blade slidably mounted in the rotor to move radially of the rotor and at right angles to the axis of the rotor, the curved wall of the said chamber being so shaped that within each quadrant bounded by a diametral line passing through the centre of the rotor and the point of contact of the rotor with the chamber, any angular displacement of the blade occasions an endwise displacement thereof through the rotor which is proportional to the square of the aforesaid angular displacement measured from the said diametral line and expressed as a fraction of a right angle, and each blade end which sweeps the curved wall of the chamber is so beveled on both sides of its mid-line that when the blade is at right angles to the line of maximum protrusion the said end makes contact with the said chamber wall along the said mid-line and along a line in that face of the blade which is towards the line of contact of the rotor with the chamber wall and nowhere else.

5. In a fluid pressure machine, the combination of a casing wherein is a drum-shaped chamber, a rotor rotatably mounted within the chamber in such a position as substantially to make contact with the curved wall of the chamber along a line that is lower than the axis of rotation and a blade slidably mounted in the rotor to move radially of the rotor and at right angles to the axis of the rotor, the curved wall of the said chamber being so shaped that within each quadrant bounded by a diametral line passing through the centre of the rotor and the point of contact of the rotor with the chamber, any angular displacement of the blade occasions an endwise displacement thereof through the rotor which is proportional to the square of the aforesaid angular displacement measured from the said diametral line and expressed as a fraction of a right angle.

In testimony whereof I have signed my name to this specification in the presence of two subscribing witnesses.

WILLIE HERBERT UTLEY.

Witnesses:
HAROLD H. SIMMONS,
A. M. HAYWARD.